Apr. 10, 1923.
R. E. ELMORE
1,451,209
LOCKING SYSTEM FOR AUTOMOBILES
Filed July 1, 1921
2 sheets-sheet 2
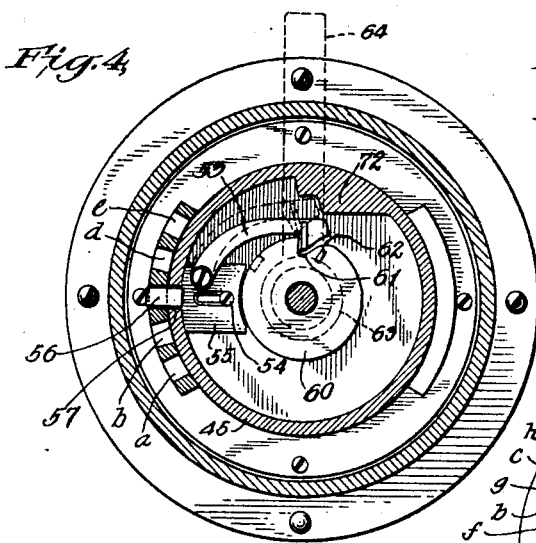
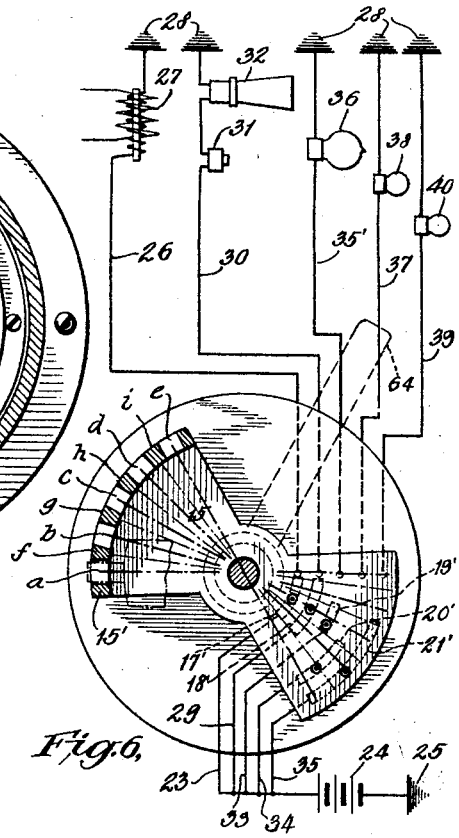
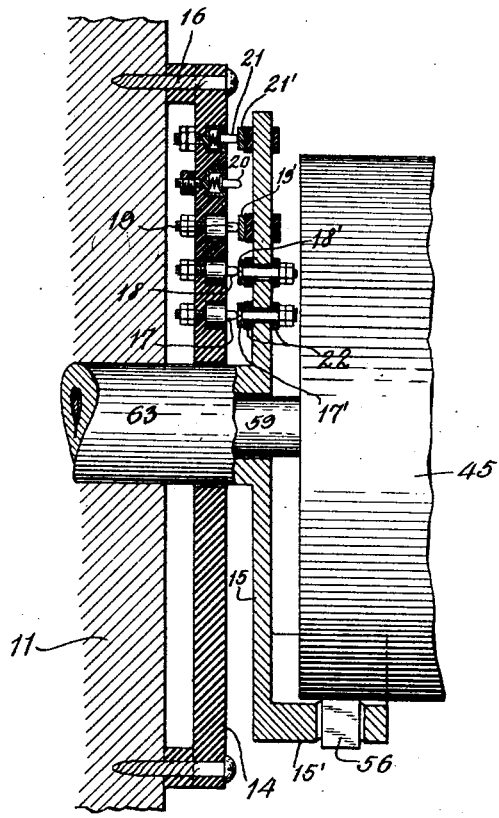
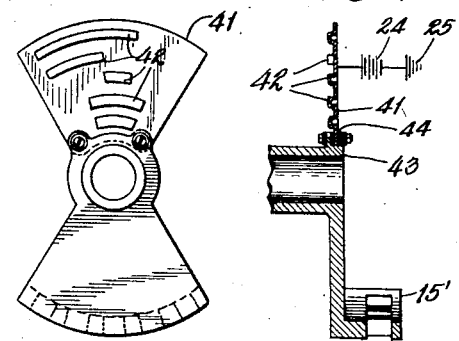
INVENTOR
RICHARD E. ELMORE
BY
ATTORNEYS Patented Apr. 10, 1923.

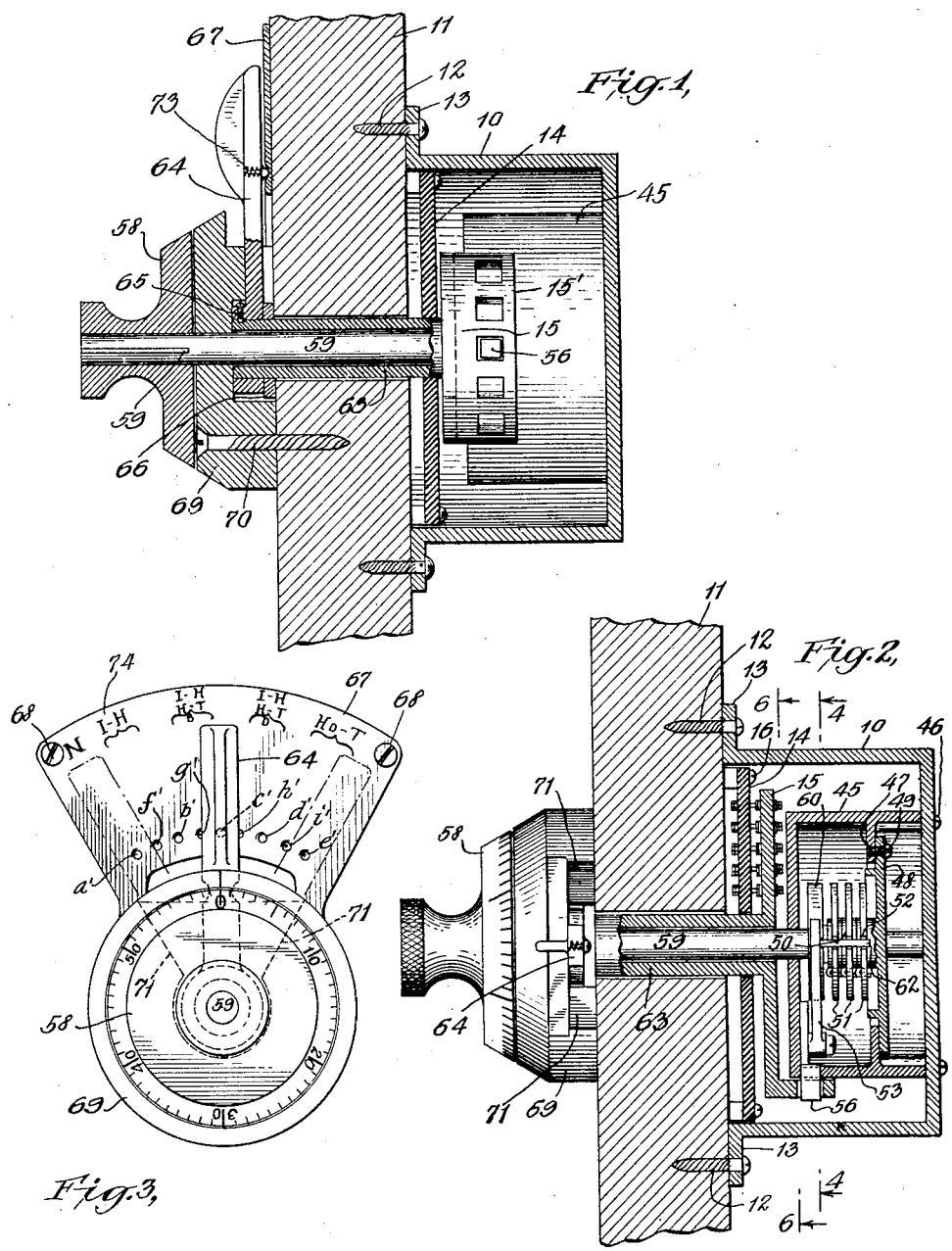

1,451,209

UNITED STATES PATENT OFFICE.

RICHARD E. ELMORE, OF NEW YORK, N. Y.

LOCKING SYSTEM FOR AUTOMOBILES.

Application filed July 1, 1921. Serial No. 481,803.

*To all whom it may concern:*

Be it known that I, RICHARD E. ELMORE, a citizen of the United States, and resident of New York city, in the county of New York and State of New York, have invented certain new and useful Improvements in Locking Systems for Automobiles, of which the following is a specification.

This invention relates to a locking system for automobiles or similar vehicles and relates more particularly to a locking switch system for controlling various automobile circuits; and has special reference to the provision of a switch mechanism and locking means therefor for controlling the circuits in various combinations of the same and for so controlling them as to prevent unauthorized use of the vehicle, the system being so constructed and arranged as to render the switch locking means difficult of manipulation or destruction by an unauthorized party contemplating theft of the vehicle.

A prime desideratum of my present invention comprehends the provision of a switch mechanism for controlling various automobile circuits in which any desired permutation or combination of the circuits may be established by simple movement of a unitary switch member to meet various desired conditions of service. As is known, the various circuits of an automobile, including, for example, the head lights bright, the tail lights, the head lights dim, the ignition and the horn circuits, are used in various combinations to meet different conditions of use. Thus, during day service with the vehicle in motion, of the circuits referred to, it is desired that a combination of ignition and horn circuits be active with the other circuits referred to kept in inactive condition. During night service with the vehicle in motion the following combinations are generally resorted to, namely the ignition and horn circuits combined with the lighting circuits in varying combinations of the latter, such as tail light and head light bright, or tail light and head light dim. Where the vehicle is not in motion during the day it is desired that all circuits be inactive. With the vehicle inoperative at night it is desired that the tail lights and head light dim circuits be closed, with the remaining circuits left open. Thus, various combinations of circuits to meet different exigencies and conditions of use are resorted to. To secure a switch mechanism of relatively simple construction affording facility of manipulation and flexibility of use in which any desired combination of such automobile circuits may be established and controlled by simple movements of a switch element, is a prime desideratum of my present invention.

In a switch mechanism of the nature above referred to, in order to prevent unauthorized tampering with any of the parts or to minimize and prevent theft of the vehicle, the switch mechanism is usually locked against movement, key locks and combination dial locks being usually provided for this purpose. It is ofttimes highly desirable to lock the switching means in any of a plurality of its positions. Thus, with the vehicle in nonuse it is desirable to have all the circuits locked against closing thereof in order to prevent theft. With the vehicle in use but not in motion during the day it is desirable to have the lighting circuits (as well at times as the horn circuit) locked against manipulation by mischievous street urchins while keeping the other circuits open. During night service with the vehicle at the curb, the head light dim and the tail light circuits should be closed with the other circuits such as the horn and ignition circuit locked against closing to prevent the sounding of the horn and to prevent the vehicle being set into motion by an unauthorized party. Thus, the switch mechanism should be so constructed that not only will it permit a flexibility of use in affording the control of various combinations of circuits, but the switch mechanism should be so constructed as to be lockable in any of a plurality of positions corresponding to different combinations of circuits to meet the various problems presented during service. The provision of such a switch mechanism and locking means therefor fulfilling the needs above enumerated is a further prime desideratum of my invention.

One of the problems in the design of switch and locking equipment for an automobile involves the provision of such a construction with the parts so corelated and arranged as to offer considerable if not insurmountable difficulties against manipulation or breaking of the locking elements when theft is contemplated. I have therefore found it desirable to provide a construction in which a combination dial means forms the means for controlling the locking elements, such means offering a greater insurance against surreptitious use of the vehicle. It may be here stated, however, that although a combination dial means is the preferred form of locking control, I contemplate also the use of other control means such as key control means associated with the other features of my invention above referred to and described in detail hereinafter.

In addition to providing a construction in which the switch mechanism is lockable in any of a plurality of its positions to fulfill the needs above enumerated, it is also desirable to provide means for preventing operation of the locking means with the switch mechanism in various of its positions. Thus, with the automobile in motion, it may be required to readily shift the switch mechanism into any of its positions to change the combination of circuits. For example, during night running the change from head light dim to head light bright should offer no difficulty. Means is therefore desired for preventing operation of the locking means in any of a plurality of positions of the switch mechanism. Where a combination dial is utilized for controlling the locking means the dial means is subject also to accidental rotation caused by vibration of the vehicle in transit, such accidental rotation being normally effective to throw the bolt of the locking means. This should be prevented where it is desired that the locking means be kept from operation. The provision of a construction in which any of the various circuits may be controlled and in which the switch member will be retained against locking whenever desired, with the dial means prevented from rotating to eliminate accidental locking of the switch mechanism is another desideratum of my invention.

Still another desideratum or object of my invention involves the arrangement of the elements making up the combination locking and switch mechanism so that the working parts of the mechanism will be inaccessible to an unauthorized party in order to minimize the possibility of the mechanism being subject to easy destruction by one with theft in view, as is the case with other devices of this nature. I have found it desirable to so arrange the parts that the switch mechanism and the locking means are located within or behind the dash board, inaccessible from the front thereof, the controlling elements such as the combination dial and switch control arm being alone mounted on the face of the dash board. With such a structure, prying or jimmying the control elements leaves the essential elements, namely the switching mechanism and the locking elements, intact and incapable of attack.

To the accomplishment of the foregoing and such other objects as may hereinafter appear, my invention consists in the elements and their relation one to the other, as hereinafter particularly described and sought to be defined in the claims, reference being had to the accompanying drawings which show a preferred embodiment of my invention, and in which:

Figure 1 is a side elevational view of the switch and locking mechanism and shown attached to a vehicle support, with parts of the mechanism shown in section, Figure 2 is a plan view thereof with parts shown in section, Figure 3 is a front face view thereof, Figure 4 is a cross sectional view thereof on the line 4—4, Figure 2, Figure 5 is a fragmentary view thereof drawn to an enlarged scale and showing the switch members and the manner of locking the same, Figure 6 is a cross sectional view on the line 6—6, Figure 2 and showing various automobile circuits controlled by the switch mechanism, Figure 7 is an elevational view of a modified form of one of the switch members, and Figure 8 is a front view of the same.

Referring to the drawings, the switch mechanism and locking means therefor comprising the essential operating parts of the apparatus are enclosed in a casing 10, such parts and the casing 10 being preferably mounted within or behind a support 11 which may be the dash board of the automobile, the casing 10 being secured to such support as by the securing screws 12 and the integral annular flange portion 13 of the casing. By mounting the casing and the parts enclosed thereby to the rear of the dash board support a construction is provided in which the essential operating parts of the mechanism are rendered inaccessible from the front of the dash board, this minimizing the possibility of having the essential operating elements tampered with or destroyed by any unauthorized person contemplating theft.

Enclosed by the casing 10 are the switch members 14 and 15 employed for the establishing of various selective circuits, the switch member 14 being the stationary member and the switch member 15 comprising the member movable relatively thereto. The stationary member 14 may take the form of a disk made of insulating material, the said disk 14 being arranged to be mounted on the support 11 as by means of the securing screws 16. The disk 14 is provided with a plurality of contact elements, one for each circuit to be controlled, the said contact elements preferably comprising a plurality of spring pressed buttons or plungers 17 to 21 respectively, the contact elements being preferably arranged in alinement, as shown, for example, in Figures 5 and 6 of the drawings. The movable switch member 15 may comprise an element having oppositely arranged sectors or wings, as clearly shown in Figure 6 of the drawings, the said member 15 being arranged to rotate relatively to the stationary switch member 14 and to be movable into a series of successive positions relatively to such stationary member. For cooperation with the contact elements of the stationary switch member, the movable switch member 15 is provided with a plurality of spaced segments 17′ to 21′, the said segments being intended for cooperation with the plunger elements 17 to 21 respectively in the completion of the various automobile circuits, as will be described more in detail hereinafter. Each of the segments 17′ to 21′ is insulatably mounted on one of the winged portions of the movable switch member 15, as by means of the insulating washers 22 shown in Figure 5 of the drawings. The movable switch member 15 is adapted to be rotated into any of a plurality of successive positions, means being provided for holding the movable switch member in any of its positions and to this end the member 15 is provided with an arcuate flange 15′, the flange being provided with a plurality of apertures $a$, $b$, $c$, $d$ and $e$ respectively, each of the said apertures being adapted to cooperate with the locking elements to be described in detail hereinafter for the purpose of locking the movable member 15 in any of its adjusted positions.

The segments 17′ to 21′ are arranged in a predetermined manner with each segment of a predetermined length so as to effect the completion of any combination or permutation of automobile circuits in any of the successive positions of the rotatable switch member 15 as may be desired. In the exemplification shown in the drawings the segments are so arranged and predetermined so as to control various combinations of the lighting circuits, the horn circuit and the ignition circuit. The segment 17′ which is connected by means of lead 23 to one terminal of the battery 24 with the other terminal of the battery grounded as at 25, is arranged to coact with the spring contact element 17 for controlling the ignition circuit and to this end the contact element 17 is connected, as by means of the lead 26, to the primary winding 27 of the induction coil of the ignition system, the said winding being grounded as at 28. The segment 18′ which is also connected to one terminal of the battery 24, as by means of lead 29, is arranged to cooperate with the spring contact element 18 for the control of the horn circuit, the said contact element 18 being accordingly connected as by means of lead 30 to the horn button 31 and horn 32 arranged in series therewith, the circuit being completed by grounding one terminal of the horn magnet as shown in Figure 6 of the drawings. The segments 19′, 20′ and 21′ which are also connected to one terminal of the battery 24 by means of leads 33, 34 and 35 respectively in turn separately cooperate with the contact buttons 19, 20 and 21, these buttons separately controlling distinct lighting circuits, button 19 being connected, as by means of lead 35′, to the bright head lights 36, contact button 20 being connected, as by means of lead 37, to the dim head lights 38, the spring button 21 being, in turn, connected, as by means of lead 39, to the tail lights 40, these lighting circuits being separately grounded for the completion of the described circuits, as appears clearly in Figure 6 of the drawings. The various circuits described may be controlled in varying combinations by providing predetermined lengths of segments 17 to 21 and by arranging such segments in a predetermined manner. Thus, in the exemplification shown in the drawings, the following combinations of circuits are controlled with the movable switch member 15 in its various positions. With the switch member 15 in the position shown in Figure 6 of the drawings, none of the segments contact the spring buttons, this position of the switch member functioning as the neutral position thereof, with the aperture $a$ of the arcuate piece 15′ registering with the locking bolt hereinafter referred to more in detail, as diagrammatically indicated in Figure 6 of the drawings. When the movable member 15 is rotated one step counterclockwise, as viewed in Figure 6, and assumes the position where the aperture $b$ is in alinement with the locking bolt, the segments 17′ and 18′ will cooperate with their respective spring plunger elements 17 and 18 for the completion of the circuits which include the ignition system and the horn, this being the desired combination of circuits for day service. When the rotatable member 15 is rotated to its next successive position, with aperture $c$ in alinement with the bolt, the ignition system, the horn circuit, the head light bright and the tail light circuits are all closed and in action. When the rotatable member 15 is rotated another step in its counterclockwise movement the head light dim circuit is substituted for the head light bright circuit. The rotatable arm 15 may be moved to its next successive position in which position the head light dim and tail light circuits only are closed. Thus, in each of the positions of the rotatable member 15 a plurality of circuits are controlled, the construction being such that any combination of circuits as is desired by any condition of service may be controlled in the successive movements of the rotatable switch member by predetermining the length of the contact segments and the relative arrangement thereof.

It will be understood that the number of segments and cooperating buttons may be increased or diminished, with the consequent increase or diminution of the number of circuits controlled thereby in order to control any desired number of devices or combination of devices in the automobile. For the purpose of easily adapting the apparatus to a change to different combinations of circuits the movable switch member may be constructed, as shown in Figures 7 and 8 of the drawings, in such manner, as to facilitate the change by a replacement of only a single element. To this end the contact segments may comprise a metallic wing piece 41 having the segment portions struck up from the metal as at 42, the wing piece 41 being insulatably mounted on the rotatable member 43 by means of washers and bolts as shown at 44. Where the number of circuits to be controlled is to be increased or diminished, in addition to interchanging wing pieces 41 the stationary switch member 14 may be also replaced by a similar switch member having a different number of contact buttons.

For the purpose of locking the rotatable switch member 15 in any of its positions I preferably provide a combination lock mechanism, this offering greater insurance against theft. The combination lock mechanism used is preferably of a construction in which the locking mechanism is spacedly mounted from the dial means connected thereto so that the locking mechanism may be made inaccessible to prevent or minimize destruction by any unauthorized person. To these ends I provide a lock casing 45 connected to the enclosing casing 10, as by securing means 46, the lock casing 45 housing the locking elements. To an integral flange piece 47 of the casing 45 is connected the disk element 48, as by means of screws 49, the disk element 48 being provided with an integral stud sleeve 50, on which are rotatably and loosely mounted a plurality of lock tumblers 51, each provided with a notch 52, the tumblers being adapted to be moved by actuation of a dial means presently to be described to effect registration of the notches to permit the descent of a locking arm 53, as is customary in such devices when opening of the lock is to be effected. Slidably mounted to a front wall of casing 45, as by means of a pin and slot connection 54, is a locking bolt 55, the said bolt being pivotally connected to the arm 53 to be movable thereby. The bolt 55 is provided with an integrally reduced portion 56 movable through an orifice 57 in the cylindrical wall of the casing 45. The cylindrical wall of the casing 45 is arranged concentrically with the arcuate flange portion 15' of switch member 15, with the said arcuate portion movable about the exterior face of the casing wall. With this construction it will be apparent that successive movement of the switch member 15 effects the registration with the casing orifice 57 of apertures $a$, $b$, $c$, $d$ or $e$ formed in the arcuate portion 15' of the rotatable member 15, the bolt portion 56 being movable through the registered apertures for the locking of the movable switch member in any of its rotated positions.

For the purpose of controlling the opening or closing of the locking bolt 56 I provide the finger dial 58 mounted on one end of the actuating or operating shaft 59, the said shaft carrying at its other end the notched disk 60. The shaft 59 is preferably an elongated shaft, as shown particularly in the drawings, the shaft connecting the dial means on one side of the support 11 to the locking element situated on the other side of the said support 11. The notched disk 60 which is moved positively by rotation of the dial 58 cooperates with the tumblers 51 for the rotation of the safe to effect the registration or alinement of the notches 52 of the tumblers with the notch 61 of the disk 60 to permit the descent of the arm 53 as hereinbefore indicated. Upon descent of the arm 53 positive movement of the disk 60 in a clockwise direction as viewed in Figure 4 of the drawings effects the movement of the arm 53, this resulting in the opening of the locking bolt or latch member 55 as is common in such devices. After the locking bolt or latch member 55 is thrown to closed position the dial may be rotated out of its said position, a cam portion 62 being provided on the disk 60 for raising the arm 53 out of the alined notches in the disk and tumblers.

For the purpose of moving switch member 15 I provide the operating sleeve shaft 63 preferably arranged in concentric relation with the dial shaft 59, the said sleeve shaft 63 being connected to the switch member 15 or made integral therewith as desired. The sleeve shaft 63 is adapted to be actuated by means of a switch arm 64 mounted in front of the dash board support 11, the switch arm 64 being fixed to the sleeve 63 as by means of the securing means 65, a washer 66 being preferably interposed on the sleeve 63. The switch arm is movable about a face or indicating plate 67 mounted as by means of screws 68 on the dash board support 11, the indicating plate cooperating with the switch arm for identifying the various positions of the said arm corresponding to the various positions of the switch member 15 as will further appear presently. By providing a construction in which the dial shaft and the operating sleeve for the switch member are arranged in concentric relation in conjunction with arranging the arcuate locking piece 15' of the switch member in concentric relation with the locking casing 45 and the lock elements enclosed thereby, a construction is effected in which the elements are arranged in a compact manner and present a rigid structure. The dial 58 may be somewhat spaced from the switch arm 64 and the dial may cooperate with a guide plate 69 stationarily mounted as by screws 70 on the support 11, the guide plate 69 being so constructed as to provide the limiting or stop shoulders 71 for limiting the rotation of the switch arm 64 to a predetermined arcuate path. Although, in providing a construction in which the switch mechanism and locking elements are spacedly mounted from the controlling dial and switch arm, I have shown the former elements separable from the latter, it will be understood that all the elements may be constructed to form a unitary structure mountable as a unit on the dash board with the locking elements and switch mechanism still spacedly mounted from the controlling means therefor to prevent accessibility to the essential operating elements by an unauthorized party.

As hereinbefore referred to, in addition to providing means for locking the switch member in any of a plurality of its positions it is desirable to provide means for preventing operation of the locking means with the switch member in various of its positions in order to meet certain conditions of service such as providing for ready shiftability from one combination of circuit to another when the car is in motion. The preferred construction therefore includes means for preventing operation of the locking means with the switch member in any of a plurality of its positions. This end is preferably accomplished by the structure and cooperative relation of the rotatable switch member and the locking elements. Between the apertures $a$, $b$, $c$, $d$ and $e$ are the integral lug portions $f$, $g$, $h$ and $i$ respectively, the said integral lug portions being operative when in alinement with bolt 56 to prevent locking of the said bolt. The member 15 may therefore be positioned in any of the intermediate positions defined by the alinement with bolt 56 of the lug portions $f$, $g$, $h$ and $i$, the locking bolt being prevented from outward movement when the member 15 is situated in any of such intermediate positions. This construction will also prevent rotation in either direction of the dial means 58, this eliminating accidental dial motion incident to vibration or shock during vehicle transit. Engagement between arm 53 and the notched disk 60 prevents counterclockwise rotation of the dial and engagement of arm 53 with the shouldered abutment 72 integral with the lock casing 45 prevents clockwise rotation of the said dial. With this preferred construction, therefore, the member 15 may be positioned in a plurality of nonlockable as well as a plurality of lockable positions, the dial means being prevented from rotation in the latter positions.

It is desired that a particular combination of circuits be established with the switch member in either a lockable or nonlockable position, the segments 17 to 21' being arranged to accomplish this end. Referring to Figure 6 it will be seen, for example, that the ignition and horn circuits will be closed when the member 15 is in either the lockable position with aperture $a$ in registration with the locking bolt, or in the nonlockable position with lug portion $f$ opposite the said bolt. Similarly, the same circuits are controlled in positions $b$ and $g$, $c$ and $h$, and $d$ and $i$ respectively. For the purpose of locating the above referred to positions of member 15 I provide the switch arm 64 with a resiliently mounted button 73 adapted to cooperate with each of a series of recesses $a'$, $f'$, $b'$, $g'$ to $e'$ on the face plate 67, as shown in Figure 3 of the drawings, these recesses corresponding to positions $a$, $f$, etc. in the arcuate piece 15'. The face plate 67 is conveniently provided with a series of legendary indications 74 designating the circuits controlled, the indications reading in Figure 3, N for neutral, I—H for ignition and horn, I—H, $H_b$—T for ignition, horn, head light bright and tail light, I—H, $H_d$—T for ignition, horn, head light dim and tail light and $H_d$—T for head light dim and tail light.

The use and operation of my apparatus will, in the main, be apparent from the above detailed description thereof. With the switch member 15 locked in any position the dial is rotated and set in accordance with the known combination, the bolt 56 being movable to open position, this releasing the arcuate locking piece 15' for permitting rotation of the switch member 15. The switch member 15 may be moved to any position by means of actuating the switch arm 64, any desired combination of circuits being closed by movement of the said switch arm to a position as indicated on the face plate 67. If it is desired to move the switch arm to a lockable position, the arm 64 may be moved, for example, to position $a'$, $b'$ or $c'$. If it is desired to move the switch member to a nonlockable position the arm 64 may be moved, for example, to position $f'$, $g'$ or $h'$. The movable switch arm may therefore be locked in any of its positions to prevent tampering or theft and for meeting various conditions of service, the said switch arm being movable also to nonlockable positions to meet further conditions of service.

From the foregoing it will be apparent that I have provided a simple switch mechanism for controlling various combinations of circuits in a facile manner, the apparatus being adaptable to various types of combinations of circuits by simple substitution of parts. It will be further apparent that the locking system is rigidly and compactly constructed to minimize theft and to prevent destruction. It will be further apparent that the parts of the apparatus permit a flexibility of use, the parts being lockable in any position to meet exigencies of use, the parts being also prevented from being locked to meet or fulfill other conditions of use. The apparatus comprises few parts as will be apparent, the parts being subject to simplicity of assembly and manufacture and the apparatus as a whole being relatively simple in construction consistent with the numerous functions accomplished thereby.

While I have shown and described my device in the preferred form, it will be obvious that many changes and modifications may be made in the structure disclosed without departing from the spirit of the invention, defined in the following claims.

I claim:

1. In an electrical switch mechanism for automobiles and the like, in combination with a series of automobile circuits controlling a series of distinct devices, a stationary switch member, having contact elements, a rotatable plate-like switch member provided with opposite wing portions, one carrying contact elements and the other including locking elements, the contact elements of the switch members comprising sets of make and break elements, a set for each of said circuits, means for moving the rotatable member into a series of successive positions; the said sets of make and break contact elements being so predetermined as to provide, in any of the successive positions of the said rotatable member, for the closing or opening of any desired permutation or combination of said series of circuits and locking means cooperating with said locking elements.

2. In an electrical switch mechanism for automobiles or the like, a stationary contact means, a rotatable contact means associated therewith comprising a plate member having opposite wing portions, one wing portion including an arcuate flange provided with a plurality of spaced orifices, means for moving the rotatable contact means in any of a plurality of positions and provisions for locking the contact means in such positions including a locking bolt movable into any of the said spaced orifices.

3. In an electrical switch mechanism for automobiles or the like, a stationary contact means, a rotatable contact means associated therewith comprising a plate member having opposite wing portions, one wing portion including an arcuate flange provided with a plurality of spaced orifices, means for moving the rotatable contact means into any of a plurality of positions and provisions for locking the contact means in such positions including a lock casing about which the said arcuate flange is movable and a locking bolt movable through a side wall of said casing and into any of the said spaced orifices, the said contact means being movable into other positions with the orifices out of registration with the bolt for preventing operation of the said locking provisions.

4. In an electrical switch mechanism for automobiles and the like, in combination with a series of automobile circuits controlling a series of distinct devices, a stationary switch member and a switch member rotatable relatively thereto, the said switch members providing sets of make and break contact elements, a set for each of said circuits, means for moving the rotatable member into a series of successive positions; the said sets of make and break contact elements being so predetermined as to provide, in any of the successive positions of the said rotatable member, for the closing or opening of any desired permutation or combination of said series of circuits and provisions for locking the said rotatable member in any one of a plurality of its said positions, the said provisions including a combination dial.

5. In an electrical switch mechanism for automobiles and the like, in combination with a series of automobile circuits controlling a series of distinct devices, a stationary switch member and a switch member rotatable relatively thereto, the said switch members providing sets of make and break contact elements, a set for each of said circuits, means for moving the rotatable member into a series of successive positions; the said sets of make and break contact elements being so predetermined as to provide, in any of the successive positions of the said rotatable member, for the closing or opening of any desired permutation or combination of said series of circuits, provisions for locking the said rotatable member in any one of a plurality of its circuit closing or opening positions and instrumentalities for preventing operation of the said locking provisions for preventing locking of said rotatable member in any of such positions.

6. In an electrical switch, in combination, a plurality of switch members providing contact elements operative to complete a plurality of selective circuits, one of the members being rotatable relatively to another, the rotatable member being movable into a plurality of positions for making and breaking the said circuits, means for locking the rotatable member in any one of a plurality of its circuit making and breaking positions, and provisions for preventing operation of said locking means for preventing locking of said rotatable member in such circuit making and breaking positions.

7. In an electrical switch, in combination, a plurality of switch members providing contact elements operative to complete a plurality of selective circuits, one of the members being rotatable relatively to another, the rotatable member being selectively movable into a plurality of positions for making and breaking the said circuits, means for locking the rotatable member in any selected position of the plurality of its circuit making and breaking positions, provisions for preventing operation of said locking means in such positions and a combination dial means for controlling the operation of said locking means.

8. In an electrical switch, in combination, a plurality of switch members providing contact elements operative to complete a plurality of selective circuits, one of the members being rotatable relatively to another, the rotatable member being movable into a plurality of selective positions for making and breaking the said circuits, means for locking the rotatable member in any selected one of a plurality of its circuit making and breaking positions, a combination dial means for controlling operation of said locking means and means for preventing movement of said dial means when the locking means is moved to open position.

9. In an electrical switch, in combination, a plurality of switch members providing contact elements operative in the completion of a plurality of selective circuits, one of the members being rotatable relatively to another, the rotatable member being movable into a plurality of sets of positions for making and breaking the circuits, means for locking the rotatable member in one position of each set and provisions for preventing operation of said locking means with the rotatable member in another position of each set.

10. In an electrical switch, in combination, switch elements comprising a stationary switch member and a switch member rotatable with respect thereto, the rotatable switch member including an operating shaft and a switch arm, means for locking the rotatable switch member, said means including a second operating shaft; the operating shafts of both switch member and locking means being coaxially arranged.

11. In an electrical switch, in combination, switch elements comprising a stationary switch member and a switch member rotatable with respect thereto, the rotatable switch member including an operating shaft and a switch arm, means for locking the rotatable switch member in a plurality of different positions of the said member, said means including a second operating shaft; the operating shafts of both switch member and locking means being coaxially arranged.

12. In an electrical switch, in combination, switch elements comprising a stationary switch member and a switch member rotatable with respect thereto, the rotatable switch member including an operating shaft and a switch arm, means for locking the rotatable switch member, said means including a second operating shaft and dial means thereon; the operating shaft of both switch member and locking means being coaxially arranged.

13. In an electrical switch, in combination, switch elements comprising a stationary switch member and a switch member rotatable with respect thereto, the rotatable switch member including an operating shaft and a switch arm, means for locking the rotatable switch member in a plurality of different positions of the said member, said means including a second operating shaft and dial means thereon; the operating shafts of both switch member and locking means being coaxially arranged and provisions for preventing rotation of the dial means when the locking means is in open position.

14. In an electrical switch, in combination, switch elements comprising a stationary switch member and a rotatable switch member, means for moving the rotatable switch member comprising an operating sleeve and an arm attached thereto, means for locking the said rotatable switch member comprising an operating shaft rotatable in said sleeve and dial means fixed to said shaft and positioned adjacent said arm.

15. In an electrical switch mechanism for automobiles or the like, a stationary switch member and a switch member rotatable relatively thereto, the said switch members providing a plurality of contact elements operative in the completion of automobile circuits, the members being arranged to be mounted on the rear of a support such as the dash board of the automobile, means for locking the rotatable switch member in a plurality of different positions, said locking means being also arranged to be mounted on the rear of the support, means for operating the rotatable switch member and provisions for controlling the locking means, said operating means and said provisions being arranged in coaxial relation to be mounted on the front of the said support.

16. In an electrical switch mechanism for automobiles or the like, a stationary switch member and a switch member rotatable relatively thereto, the said switch members providing a plurality of contact elements operative in the completion of automobile circuits, the members being arranged to be mounted on the rear of a support such as the dash board of the automobile, means for locking the rotatable switch member in a plurality of positions, said locking means being also arranged to be mounted on the rear of the support, means for operating the rotatable switch member and combination dial provisions for controlling the locking means, said operating means and said provisions being arranged in coaxial relation to be mounted on the front of the said support.

Signed at New York city in the county of New York and State of New York, this 29th day of June, A. D. 1921.

RICHARD E. ELMORE.